United States Patent
Ortega Linares et al.

(10) Patent No.: US 9,413,290 B2
(45) Date of Patent: Aug. 9, 2016

(54) SUITABLE CONTROL METHOD FOR A SYSTEM OF PHOTOVOLTAIC CONCENTRATION MODULES

(71) Applicant: ABENGOA SOLAR NEW TECHNOLOGIES S.A., Seville (ES)

(72) Inventors: Manuel Gil Ortega Linares, Seville (ES); Francisco Rodríguez Rubio, Seville (ES); Manuel Guerrero Cano, Seville (ES); Pablo Noriega Gil, Seville (ES)

(73) Assignee: ABENGOA SOLAR NEW TECHNOLOGIES, S.A., Seville (ES)

( * ) Notice: Subject to any disclaimer, the term of this patent is extended or adjusted under 35 U.S.C. 154(b) by 240 days.

(21) Appl. No.: 14/364,062

(22) PCT Filed: Dec. 14, 2012

(86) PCT No.: PCT/ES2012/070868
§ 371 (c)(1),
(2) Date: Sep. 17, 2014

(87) PCT Pub. No.: WO2013/087967
PCT Pub. Date: Jun. 20, 2013

(65) Prior Publication Data
US 2015/0013751 A1  Jan. 15, 2015

(30) Foreign Application Priority Data

Dec. 15, 2011  (ES) .................................. 201132022

(51) Int. Cl.
*G01R 31/40* (2014.01)
*F24J 2/38* (2014.01)
(Continued)

(52) U.S. Cl.
CPC . *H02S 50/00* (2013.01); *F24J 2/10* (2013.01); *F24J 2/38* (2013.01); *F24J 2/407* (2013.01);
(Continued)

(58) Field of Classification Search
CPC .......... H02S 50/00; F24J 2/38; G01S 3/7861; Y02E 10/47; Y02E 10/50; H01L 31/02021
See application file for complete search history.

(56) References Cited

U.S. PATENT DOCUMENTS

| 2010/0101621 | A1* | 4/2010 | Xu | .......................... | C09K 5/063 |
| | | | | | 136/206 |
| 2011/0058802 | A1* | 3/2011 | Forutanpour | .......... | H04N 5/232 |
| | | | | | 396/225 |
| 2012/0211001 | A1* | 8/2012 | Elshafei | ..................... | F24J 2/38 |
| | | | | | 126/601 |

FOREIGN PATENT DOCUMENTS

CN           101877559           11/2010

OTHER PUBLICATIONS

Alexandru, C. , et al., "Different Tracking Strategies for Optimizing the Energetic Efficiency of a Photovoltaic System", *2008 IEEE*; 6 pages.

(Continued)

*Primary Examiner* — Seung C Sohn
(74) *Attorney, Agent, or Firm* — Blakely Sokoloff Taylor & Zafman LLP (57) ABSTRACT

The invention relates to a suitable control method for a system of photovoltaic concentration modules, which can be used to maintain the correct orientation of the modules in order to track the sun without requiring the use of positioning sensors. The sun is tracked by performing angular movements in relation to each of the degrees of freedom at given intervals, measuring the power or current supplied by the energy collection module(s). The estimation of the sun's position and the strategy for subsequent movements are determined as a function of the reading.

18 Claims, 3 Drawing Sheets

(51) Int. Cl.
  G01S 3/786   (2006.01)
  H01L 31/02   (2006.01)
  H01L 31/042  (2014.01)
  H01L 31/052  (2014.01)
  F24J 2/10    (2006.01)
  F24J 2/40    (2006.01)

(52) U.S. Cl.
  CPC ......... *G01S 3/7861* (2013.01); *H01L 31/02021* (2013.01); *H01L 31/0422* (2013.01); *H01L 31/0522* (2013.01); *Y02E 10/47* (2013.01); *Y02E 10/50* (2013.01)

(56) References Cited

OTHER PUBLICATIONS

Alexandru, C., et al., "Simulation of a Dua-Axis Solar Tracker for Improving the Performance of a Photovoltaic Panel", *Proc. IMechE vol. 224 Part A: J. Power and Energy*; pp. 797-811, Apr. 9, 2010.

Alexandru, Catalin, "The Design and Optimization of a Photovoltaic Tracking Mechanism", *POWERENG 2009*; Lisbon, Portugal, Mar. 18-20, 2009; *IEEE*; pp. 436-441.

Alexandru, Catalin, et al., "The Energy Balance of the Photovoltaic Tracking Systems Using Virtual Prototyping Platform", 978-1-4244-1744-5/08 *2008 IEEE*; 6 pages.

Chong, Kok-Keong, et al., "Integration of an On-Axis General Sun-Tracking Formula in the Algorithm of an Open-Loop Sun-Tracking System", *Sensors 2009*; 9; pp. 7849-7865.

Chong, Kok-Keong, et al., "Open-Loop Azimuth-Elevation Sun-Tracking System Using On-Axis General Sun-Tracking Formula for Achieving Tracking Accuracy of Below 1 MRAD", *2010 IEEE*; pp. 3019-3024.

Jaen, Carles, "Overview of Maximum Power Point Tracking Control Techniques Used in Photovoltaic Systems", *2008 IEEE*; pp. 1099-1102.

Kelly, Nelson A., et al., "Increasing the Solar Photovoltaic Energy Capture on Sunny and Cloudy Days", *ScienceDirect; Solar Energy* 85; 2011; 2010 Elsevier Ltd.; pp. 111-125.

Marinescu, Daniela, et al., "Control Optimizing Algorithm for Soft Sun-Trackers", *2006 IEEE*; 4 pages.

Mousazadeh, Hossein, et al., "A Review of Principle and Sun-Tracking methods for maximizing solar systems output", *Renewable and Sustainable Energy Reviews*; 2009 Elsevier Ltd., pp. 1800-1818.

Rubio, Francisco R., et al., "Application of Position and Inertial-Rate Control to a 2-DOF Gyroscopic Platform", *Robotics and Computer-Integrated Manufacturing*; 2009 Elsevier Ltd; pp. 344-353.

Rustemli, Sabir, et al., "Performance Comparison of the Sun Tracking System and Fixed System in the Application of Heating and Lighting", *The Arabian Journal for Science and Engineering*; vol. 35; No. 2B; pp. 171-183, Oct. 2010.

Sefa, Ibrahim, et al., "Application of One-Axis Sun Tracking System", *Energy Conversion and Management*; 2009 Elsevier Ltd.; pp. 2709-2718.

Tambo, Toyokazu, et al., "Search Method of Sun Using Fixed Five Photodiode Sensor", *IEEJ Transactions on Sensors and Micromachines*, vol. 129, Issue 2, pp. 53-59 (2009).

Teng, Tun-Ping, et al., "Research and Development of Maximum Power Transfer Tracking System for Solar Cell Unit by Matching Impedance", *Renewable Energy*; 2009 Elsevier Ltd; pp. 845-851.

Xu, Xiaoli, et al., "A Study on All-Weather Flexible Auto-Tracking Control Strategy of High-Efficiency Solar Concentrating Photovaltaic Power Generation System", *2010 Second WRI Global Congress on Intelligent Systems; 2010 IEEE*; pp. 375-378.

Yung, Chee-Fai, et al., "Optimal Regional Pole Placement for Sun Tracking Control of High-Concentration Photovoltaic (HCPV) Systems; Case Study", *Optimal Control Applications and Methods*; 2010; 31:581-591.

* cited by examiner

SUITABLE CONTROL METHOD FOR A SYSTEM OF PHOTOVOLTAIC CONCENTRATION MODULES

CROSS-REFERENCE TO RELATED APPLICATIONS

The present patent application is a national phase application of International Application No. PCT/ES2012/070868, filed Dec. 14, 2012, which application claims priority to Spanish Application No. P 201132022, filed Dec. 15, 2011.

OBJECT OF THE INVENTION

The present invention relates to a suitable control method for a system of CPV (concentrated photovoltaic) modules that allows the maintenance of the correct orientation of the modules for solar tracking without using positioning sensors. Solar tracking is carried out by performing angular displacements at given time intervals within each of the degrees of freedom by measuring the power or current delivered by the energy harvesting module(s). Estimating the Sun's position and the strategy of subsequent movements are determined based on this reading.

BACKGROUND OF THE INVENTION

The power generated by a PV system depends on its orientation relative to the Sun's position. Tracking systems are devices that change the orientation of the solar energy harvesting modules so that the orientation, at each time point, is as close as possible to the Sun's position.

In particular, solar energy harvesting modules consisting of conventional PV panels offer a performance which depends on the angle of incidence of the rays. However, even when this angle is great, the modules continue to harvest power even if to a lesser extent. Other types of solar energy harvesting modules are concentrator modules. These modules do not cover the entire surface irradiated with semiconductor material, but are formed by a surface formed by concentrating lenses that focus the radiation incident on a small area in which the semiconductor or solar cell is located. In general, concentrated PV systems are much more sensitive to deviations from the correct orientation to the Sun. Even with small deviations, the non-targeting of beams incident on the semiconductor can cause a significant drop in the power produced.

The prior art reveals auxiliary devices that measure the targeting error of the system relative to the Sun's position. This measure is interpreted and used by a control means which in turn act on drive means of the tracking device so that the solar energy harvesting modules maintain the correct orientation.

An example auxiliary device is one which makes use of a plurality of solar-radiation-sensitive areas located on a plane and distributed around a point; and an opaque element located on that point, distanced away from the plane, intended to throw shadow on the plane where the sensitive areas are located.

When the orientation of the plane where the solar-radiation-sensitive areas are located is perpendicular to the radiation, then the element found on this plane casts shadow on the point around which the sensitive areas are distributed without any of them undergoing a reduced radiation reading. By contrast, when the plane is not oriented perpendicularly to the direction of radiation, the shadow covers some of the sensitive areas. Depending on which sensitive area is completely or partially covered, it is possible to determine the degree of deviation of the plane orientation of this auxiliary device. Such and other auxiliary devices have several drawbacks. The first is that the dirt could distort the reading, as shadows may be generated being interpreted as deviations from the orientation device. A not very large particle may prevent the correct orientation of an entire solar energy harvesting module and the latter may be installed in a place where it is not easily or immediately accessed.

Another drawback to the use of auxiliary devices that determine the targeting error is that such devices measure the error in orientation with respect to the direction of incidence of the rays and not the error in the orientation of the entire system. It is therefore necessary to ensure that the targeting sensor and the tracker have the same orientation. However, this orientation relative to one another is not always perfect, is subject to assembly errors; and can be modified by problems such as the deformation or misalignment of the structural elements.

The present invention is a method for properly orienting a CPV system without using auxiliary elements to measure the targeting error.

DESCRIPTION OF THE INVENTION

A first aspect of the invention is a suitable control method for a CPV module system according to claim 1.

A second aspect of the invention is a device according to claim 13 adapted to carry out the control method according to the first aspect of the invention.

DESCRIPTION OF THE DRAWINGS

These and other characteristics and advantages of the invention will become more apparent from the detailed description of a preferred embodiment that follows, given only by way of illustration and not limiting the scope of the invention, with reference to the accompanying figures.

DETAILED DESCRIPTION OF THE INVENTION

As indicated in the description of the invention, a first aspect of the invention is a suitable control method for a CPV module system. This method allows the proper tracking of the sun to optimize performance wherein the system comprises:

at least one solar energy harvesting module to supply power to a load. The solar energy harvesting module need not necessarily be a concentrator module, however, this method is especially advantageous in this type of device and it has been proven to offer sufficient accuracy to maintain the correct orientation.

The load supplied with energy is usually a power distribution network which transfers the generated energy.

an orientation device provided with one or more degrees of freedom $y_j$, j=1, 2, ... according to one or more axes of rotation $E_j$, j=1, 2 ... adapted to position the solar energy harvesting module at a specific angle $X_{dis}=(\gamma_1', \text{ and } \gamma_2', \ldots )$, Usually orientation devices are structures on which solar energy harvesting modules are installed wherein such structures are configured as a kinematic chain with a certain number of degrees of freedom.

The first element of the kinematic chain is a fixed support and the last element of the kinematic chain is integral to solar energy harvesting module. These degrees of freedom and how the kinematic chain is configured can be quite varied.

Most commonly, as an example, the orientation device has two degrees of freedom. On a fixed support, a first rotation allows orientation in azimuth of a second support driven by this first rotation. On this second support there is a third support linked by a second rotation, which determines the degree of elevation of the third support. This third support supports the solar energy harvesting module.

The vector formed by the angles which determine the angular position of solar energy harvesting module is the vector which we have called $X_{dis}$ drive means adapted to move the orientation device in each of the axes of rotation $E_j$, j=1, 2 . . . .

Each degree of freedom implies the existence of a drive means that can move the orientation device relative to the axis associated with such degree of freedom. It is understood that the drive means associated with one degree of freedom can operate independently of those associated with a different degree of freedom.

The Sun is the reference to be followed by the orientation device which drags the solar energy harvesting modules. The sun follows a trajectory moving continuously. The method according to the invention establishes a time discretization, not necessarily being uniform, so that an evaluation is conducted at each instant of time of such discretization to determine whether movement should be carried out or not.

The method takes into account an estimate of the Sun's position and the angular position of the orientation device. Movement of the modules is considered necessary when the difference between the two, for a given degree of freedom is greater than a pre-set threshold value for that degree of freedom.

If movement is necessary, the drive means are acted upon to approximate the orientation of the orientation device to the Sun's position, estimated according to the steps as detailed below. The assessment is carried out for each degree of freedom independently without being essential the order followed by all degrees of freedom.

measuring means either of power or of the current delivered by the solar energy harvesting module, The control scheme on which this method is based is a closed loop. Specifically, the action of changing the orientation of the orientation device depends, among other factors, on the reading obtained from the power or current generated by the solar energy harvesting modules.

The angular displacement of the modules along one of the axes associated with a degree of freedom results in a generated power which varies during displacement depending on the orientation of the module at each instant. This reading of power delivered during displacement is used to establish the estimation of the Sun's position. That is, during each movement the continuous reading of the power or current supplied by the power harvesting modules is performed and the Sun's position is estimated post hoc. The continuous reading can be effected by a series of discrete readings allowing for example the reconstruction by interpolation of the evolution of power or current delivered during displacement.

a processing unit coupled to the means for measuring the power or intensity delivered and adapted to generate commands which set the movement of the orientation device.

This is the processing unit which receives at least the power or current reading signal, and which implements the method of the invention. The most common way of implementing this processing unit is by means of a programmable processing unit, Wherein the control through the processing unit establishes the solar tracking by the solar energy harvesting module according to the following steps:

defining a reference function $P_{ref}$ determining an estimation of the Sun's position $X_{sol}=(y_1, y_2, \ldots)=X_{ref}$ wherein $X_{ref}=(y_{r1}, y_{r2})=P_{ref}\{t, lat, lon)$ dependent at least on the date, time, latitude and longitude generating commands to direct the orientation device to a first point $X_{dis}=X_{ref}$. By means of the coordinates $X_{sol}$ the angular coordinates of the estimated solar position is denoted. In one embodiment, this estimation is corrected in each correction iteration of the position of the orientation device to account for possible structural errors or other causes leading to the divergence of the device.

To begin with, the method requires a first positioning estimating the Sun's position. This first positioning depends on the date, time, latitude and longitude. There are equations with these parameters as arguments and provide a mathematical model to determine an estimation of the Sun This initial estimation can also be stored in tables in order to determine the estimation of the Sun's position using interpolation techniques. These models do not take into account the structural deviations or other causes that result in errors between the target position and the position that the solar energy harvesting module actually takes. Additionally, one embodiment of the invention uses an error table to correct the values provided by the equations to account for these deviations.

for each axis of rotation $E_j$ setting a threshold value $\epsilon_j$, j=1, 2, . . . of minimum angular deviation;

Each degree of freedom may require different threshold values because, for instance the deviations from this degree of freedom lead to major deviations of the focus of concentrated radiation compared with the deviations in another degree of freedom. This is the threshold that determines whether it is necessary to carry out a movement or not at each instant of time.

for each instant of time $t_i$ from a sequence of time instants established by the processing unit, while the harvesting modules are operational, and in each of the axes of rotation of the orientation device $E_j$ j=1, 2, . . . , taking the $E_j$ axes in any order, the sequence of steps a)-e) is carried out: When there are several degrees of freedom, the set of steps a)-e) is applied to each degree of freedom separately. As discussed above, discretization in time is not necessarily homogeneous. For example, the time intervals will be smaller when the movement of the Sun is faster. While it is the processing unit that sets this time discretization, time measurement can be performed by an external device such as a quartz watch with a meter or the internal clock of the processing unit itself.

a) the estimation of the angular coordinate of the Sun's position $y_{rj}$ is determined based on the reference function $P_{ref}$ in $t_i$ and the angular deviation $\delta y_j$ between said estimated position $y_{rj}$ of the Sun and the angular position of the orientation device $y_j'$ in the previous instant of time is calculated, The estimated position of the Sun $X_{sol}$ has been initially estimated using the function $P_{ref}$ for example using the Sun equations and have caused a first movement of the orientation device. In this first iteration of the bootstrap values of the iterative loop are those corresponding to the identification "in the previous instant" After the first step and throughout those following, the estimation of the Sun is again evaluated using measures of power or current delivered by the solar energy harvesting module according to the strategy described below.

Thus, in the first iteration of the loop comprising steps a)-e), the angular position of the device $y_{rj}$ shown in step a) is that of the device after moving to the position determined by the reference function $P_{ref}$, and in the second iteration and following of the loop, this variable takes the value determined after moving to the position determined by the estimation $X_{sol}$ which has been calculated in the previous iteration based on the reading either of the power or of the current coming from the solar energy harvesting module.

As now the instant of time $t_i$ in the current iteration is the one corresponding to instant $t_i+1$ if it the previous iteration is taken as a reference, at this instant the estimated position of the Sun $X_{sol}$ valued in step e) now corresponds with the previous instant of time $t_{i-1}$. For this reason at the instant of time $t_i$, in order to establish the need to continue, the estimation of the Sun's position determined by the reference function $P_{ref}$ is again taken as the first estimation. This first estimation is again corrected after the device has progressed through step e). The manner in which it is corrected is described in the next step.

In view of the variables involved, there are at least 3 angular positions: the angular position the orientation device actually has denoted by $X_{dis}$, the estimated position of the sun denoted as $X_{sol}$, and the actual position of the Sun and which is what is to be estimated with the power or current readings. From these coordinate vectors, as the set of steps a)-i) are performed for a single degree of freedom, only the relevant angular coordinate is taken into account, for example $y_j$ or $y_j'$ as appropriate.

b) if the angular deviation $\delta\gamma_j$ is greater than its minimum deviation threshold value $\epsilon_j$ an advance distance $\alpha_j$ is set along the forward direction for the orientation device on that axis $E_j$, such that the position advanced $y_j'+\alpha_j$ is ahead of the Sun's estimated position $y_{rj}$ on that axis $E_j$, and a null value is set if the angular deviation is less than the same threshold value, If the estimation of how much the Sun has moved forward between time instants $t_{i-1}$, $t_i$ determines that it is necessary to move forward, this advance is used to re-estimate the position of the Sun, as during the angular displacement of the energy harvesting module, the reading of the power or current supplied is performed, and this is the reading used to perform the calculations for the estimation.

Thus, at time $t_i$ an initial estimation of the Sun's position $y_{rj}$ is determined, taken from the reference function $P_{ref}$. By knowing this estimation of the Sun's position and the position of the device $y_j$, held at the previous time instant $t_{i-1}$, there is an advance movement $\alpha_j$ which must be greater than the difference between $y_{rj}$ and $y_j$. This ensures that when moving forward, the advance goes beyond the Sun's position; i.e., ensuring that the maximum reading of the power or intensity measured is within the reading range.

In a preferred embodiment of the invention the additional amount advanced is a pre-set angle which can be changed if it is noted not to always fulfil its purpose adequately. In this embodiment, the advance will be $(y_{rj}-y_{j.})$ plus a certain pre-set positive value.

In another embodiment, a correction factor is added to the reference values $P_{ref}$ used to provide an estimation of the Sun's position, correction factor which takes into account the deviation of the positioning device relative to the target position. These correction factors are evaluated at each step and can be used later for example on subsequent days.

As indicated, the displacement of the module is only carried out using a single degree of freedom at a time. The remaining degrees of freedom are kept fixed or blocked. An angular displacement in module of solar energy harvesting module results in a variation of the power or current delivered as it changes its angular position relative to the angular position of the Sun Since the remaining degrees of freedom are blocked, the angular position closest to the angular position of the Sun using a single degree of freedom does not need to correspond with the correct position of the Sun because the blocked degrees of freedom may also have small deviations.

Even in this case, the closest point will result in a maximum power or current reading. Under this assumption, the displacement carried out while reading the power or current delivered is determined as large enough to overcome the angle where it is estimated that the maximum is reached. Thus, the power or current delivered will in principle lead to a concave down function with a local maximum.

The sequence of steps a)-e) results in an optimal control method. However, the method can be made more robust against the presence of interference by checking for irregular conditions in which not only a concave down function with a local maximum is taken into account, but other situations that would otherwise result in solar loss.

Determining the need to advance means that the minimum deviation threshold value $\epsilon_j$ has been exceeded. The condition of establishing a null value of $\alpha_j$ in the opposite case, that is, if the angular deviation is smaller than the minimum deviation threshold value $\epsilon_j$, is to be interpreted that the method determines that at this step there is no advance and therefore the remaining steps c)-e) of the iterative process do not need to be assessed.

As a result, the next iteration follows considering the following degree of freedom; or it is necessary to wait for the next time instant if all degrees of freedom have already been subject to iteration.

c) determining $x_0$ as the initial position $y_j'$ before advance and $x_1=y_j'+\alpha_j$ as the final position after going forward; and generating commands for the advance along the axis $E_j$ of the orientation device to point $x_1$, d) defining a function $P(x)$ in the interval $[x_0, x_1]$ wherein $P(x)$ corresponds to the measurement provided by the measuring means either of the power or of the current delivered by the solar energy harvesting module throughout the trajectory $[x_0, x_1]$ according to the axis $E_j$ These two steps c) and d) are those that specify the action already described: the energy harvesting module moves the estimated distance and during displacement a function is constructed representing the reading conducted to estimate the Sun's position for the degree of freedom being worked with.

e) assessing the maximum $P_{max}$ of the function $P(x)$ in the interval $[x_0, x_1]$ and the point $X_m$ at which such maximum $P_{max}=P(x_m)$ is located, and setting $y_j=x_0+\beta$ wherein $\beta<\alpha_j$, $\beta$ being such that $y_j$ takes $X_m$ wherein the maximum value $P_{max}=P(x_m)$ is located. The maximum value is used to set the point $X_m$ corresponding to the value of the angle of the estimated position of the Sun where this maximum occurs. This point is set as the estimation of $y_j$.

There are suboptimal situations that can cause the Sun to be lost. To make the method more robust and enabling solar tracking in these suboptimal conditions, additional checks and actions may be optionally performed.

The first verification to consider is whether there are disturbances in the reading modifying the function $P(x)$ so that the point $X_m$ no longer corresponds to the point where the maximum of $P(x)$ is really found. When it is possible to establish that these disturbances exist, then if the presence of such disturbances is detected, a forward movement of a predetermined amount is established regardless of where the maximum has been read; i.e., $\beta$ is selected as $k\,\alpha_j$ wherein k takes values between 0 and 0.5, preferably 0.5.

The following set of additional and optional steps correspond to decisions to be taken depending on the possible scenarios that can occur:

Evaluating a coefficient of $C_u$ between 0 and 1, preferably 0.95, and a threshold value $U=c_u P_{max}$. This is the threshold value is calculated as a percentage of the maximum value.

This threshold value aims to prevent the existence of parts of the domain $[x_0, x_1]$ with an excessive power decrease, because if this happens, it may indicate for example that the radiation has decreased due to the presence of a cloud or because there has been excessive departure from the Sun's position. In each case it is necessary to take the most appropriate action.

if $P(x_0)$ is greater than U and $P(x_1)$ is greater than U, then setting $y_j=x_0+\beta$ wherein $\beta<\alpha_j$.

This step corresponds to the desired situation and corresponds to default advance. The power is always above the threshold power value and the estimation of the Sun's position is at a point to the right of $x_0$. The value of $\beta$ is such that the point $X_m$ is taken, where the maximum is found, unless, as described, there are disturbances that result in having to pre-set a certain value as the correct reading is invalidated P(x).

If $P(x_0)$ is greater than U and $P(x_1)$ is smaller than U, calculation of the point $x_2$ such that $P(x_2)=U$, and then establish $y_j=x_2-\beta$ wherein $\beta<\alpha_j$, Initially the power or value of the current is above the threshold value but it is at the end of the movement where the function P(x) falls below the threshold value. One reason for this situation is having advanced in excess.

The first measure is to reduce the domain extending the interval to the point $x_2$ where the function P(x) falls below the threshold value.

In this interval the estimation of the Sun's position is established.

If $P(x_0)$ is less than U and $P(x_1)$ is greater than U, calculation of the point $x_2$ such that $P(x_2)=U$, and then set $y_j=x_2+\beta$ wherein $\beta<\alpha$, $\gamma$ This is the opposite situation to the preceding step. In this case the domain of the function P(x) is also reduced from the left to the point where such function is above the threshold value and also a new estimation of the position of the Sun in the restricted range is conducted.

As explained, the method according to the first aspect of the invention allows to estimate the position of the Sun performing a displacement in a single degree of freedom and taking the position of the trajectory in which more power or current is generated; now, considering that the load connected to the solar energy harvesting system is deemed constant. In principle the load is constant when there are no inverters or devices such as MPPTs ("Maximum power point trackers"). However, even if such devices exist, the invention according to various particular embodiments take into account such cases.

When the load is not constant, a way of carrying out the invention is to perform a permutation between the load given by the network which the generated power is delivered to and a fixed load. This fixed load receives the power delivered by the energy harvesting module and therefore does not cause disturbances in the function P(x). This switching is maintained at least during the reading of the function P(x).

According to another exemplary embodiment, a reading of the disturbance is performed and it is compensated in the signal delivered by the power or current measurement means. This example is particularly valid for example when using MPPT devices where it is possible to know the disturbance introduced.

According to another embodiment, the processing unit has an output with which it is capable of acting on the elements that generate the disturbance, either by minimizing it or even causing the disconnection during the period of time when the reading to build the function P(x) is performed.

An example implementation of the invention is described below using figures.

It has been said that when moving in a coordinate (with respect to one of the axes $E_j$), the instant power or current generated during movement is analysed subject to prior filtering. Subsequently, the maximum of the power curve is calculated and compared with a minimum threshold.

When the maximum does not exceed a minimum threshold $U_m$ (this minimum threshold is not the parameter U), it is considered that during the movement, the Sun has not been detected, so an estimation of its position is not set. In this case it is concluded that the platform has been lost or partially lost, and steps are taken accordingly, for example applying a known solar search procedure by using a spiral or the correction of the previous day coupled with the solar equations. In one implementation of the invention, in the event of not exceeding the $U_m$ threshold, but the radiation level measured by an external device fails to exceed a certain pre-set value, it is considered that there is not sufficient radiation. No movement is performed until this condition disappears.

On the contrary, in the event that the maximum exceeds the minimum threshold, then the threshold value U is defined, preferably with a value of 95% of the maximum power. Once established the threshold U, the curve P(x) obtained during movement is divided into two areas: a first area where the positions of the trajectory have led to higher power or current readings than said threshold and a second area in which this has not happened. Depending on the curve and considering this separation in the areas, the following cases have been identified:

No Power

Figure 1:
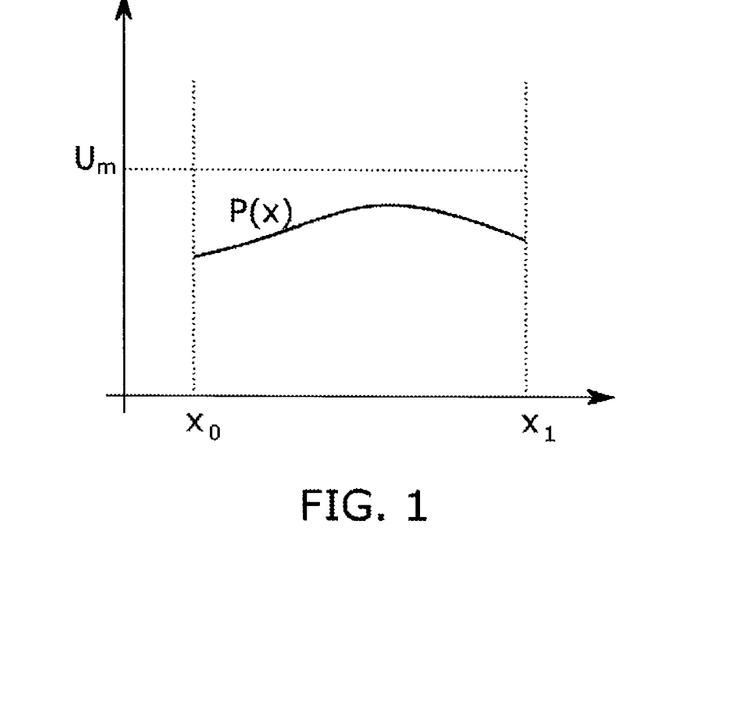
FIGS. 1-5 The five figures show a sequence of graphs of the reading of the power or current delivered by a solar energy module during a displacement phase for different possible cases.

This case refers to the situation in which the instantaneous current or power captured by energy harvesting modules does not at any time exceed the minimum threshold $U_m$. In this case the estimation of the Sun's position is not updated in the relevant coordinate and it is concluded that the platform is lost or partially lost. This case is shown in FIG. 1.

Both End Limits Above the Threshold

Figure 2:
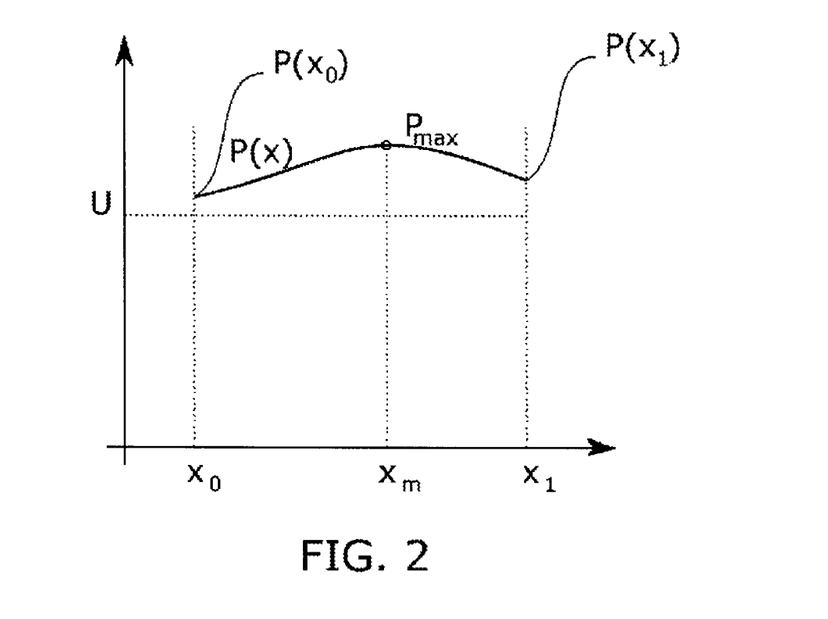

Henceforth, in the headings of the various cases, where use is made of the term end limit, it refers to the end of the interval in which P(x) function is defined. This case relates to the situation in which all values of the instantaneous power or current P(x) are above the threshold value U determined as a percentage of the maximum value of P(x) as shown in FIG. 2. In this case the point $X_m$ where the maximum is reached is established and it is this coordinate, that of the angular position relative to the axis $E_j$, in which the reading of P(x) has been carried out. The coordinate x is a variable representing the angular coordinate relative to the axis E.

A first example embodiment established that the estimation of the Sun's position $X_{sol}$ corresponds to the point $X_m$ where the maximum is reached. In another embodiment of the invention the estimation of the Sun's position takes the average value of the interval. Tests performed with the first example embodiment have given better results in the absence of load disturbances.

Figure 3:
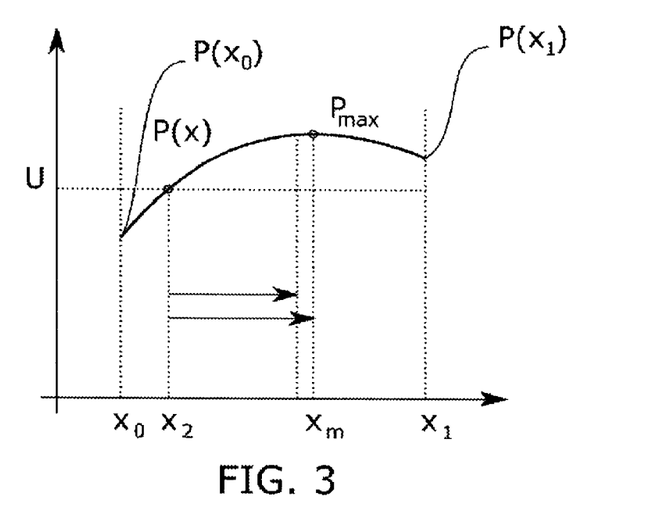

The First End Limit Below the Threshold and the Second End Limit Above the Threshold This case corresponds to the situation in which there is a first zone at the beginning of the variation interval of the function P(x) in which the power or current is below the threshold value U; and, a second zone at the end of the interval in which P(x) assumes values above the threshold value U. This case is shown in FIG. 3.

First the cut-off point of the function P(x) is determined with the horizontal line established by the threshold value U. The first zone is to the left of the cut-off point $x_2$ and the second zone is to the right of the cut-off point.

According to one embodiment of the invention an estimation of the Sun's position is carried out in the second zone. This estimation is taken at a forward point, a distance β smaller than the width of the interval. One embodiment provides a certain percentage of the advanced angle ah preferably half. In FIG. 3 the forward point is represented by a horizontal arrow which does not reach where the maximum occurs. This choice provides a method that has been experimentally proven to be very robust even in the presence of disturbances such as the existence of a MPPT device. Another embodiment takes the coordinate at which the maximum of P(x) is found as the estimation of the Sun's position in that angular coordinate. This position is indicated by a second horizontal arrow situated beneath the first one and which does reach the place where the function is maximum. This value, although proven to be less robust in the presence of disturbances, is a good estimation in the absence of such disturbances or if they have been compensated.

In the case where the local maximum is at the right end of the interval and in the absence of disturbances, what has happened is that the movement carried out has not been enough to overcome the Sun's position as required by the method. In this case it is necessary to conduct advance further. This is one example where it is possible to insert an advance in the method according to the invention to prevent loss of solar targeting anticipating the fault by analysis of the function P(x). For this advance movement a reading of a new function P(x) would be again conducted to re-estimate the position of the Sun. In the case of disturbances, these disturbances can lead to determinations of the point at which the maximum that is not consistent with the real one can be found, hence in these cases the determination of a pre-set advance is safer.

Figure 4:
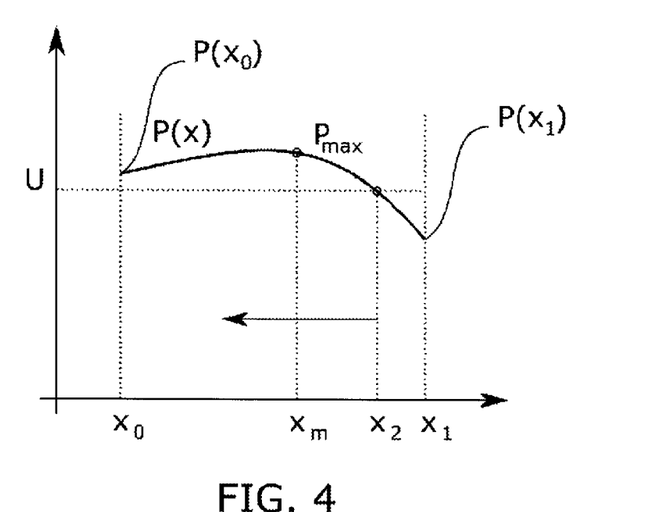

The First End Limit Above the Threshold and the Second End Limit Below the Threshold This is the opposite case to the preceding one. As shown in FIG. 4 initially P(x) is above the threshold value U; but beyond a cut-off point the power or current falls below the threshold value U. This can happen for example when the advance is excessive and defocusing occurs in the energy harvesting module.

The first step to take is to calculate the cut-off point $x_2$ of function P(x) with the horizontal line determined by the threshold value U; and to establish a backward movement to correct excessive advance.

The estimation of the Sun's position is set to the point $x_2$−β wherein β is a value smaller than the width of the interval [$x_0$, $x_1$] and causes that, in the next step involving an advance, there is a backward movement of a given distance, preferably half of the interval. This backward movement has been represented in FIG. 4 by a horizontal arrow which points to the left.

As in the preceding case, it is also possible to establish a backward movement which instead of adopting the distance $x_2$−β, goes back to $X_m$ where the maximum value $P_{max}$ occurs Both End Limits Are Below the Threshold This situation occurs when, although the end limits are below a threshold value U, there are other positions that are above the threshold value U.

Figure 5:
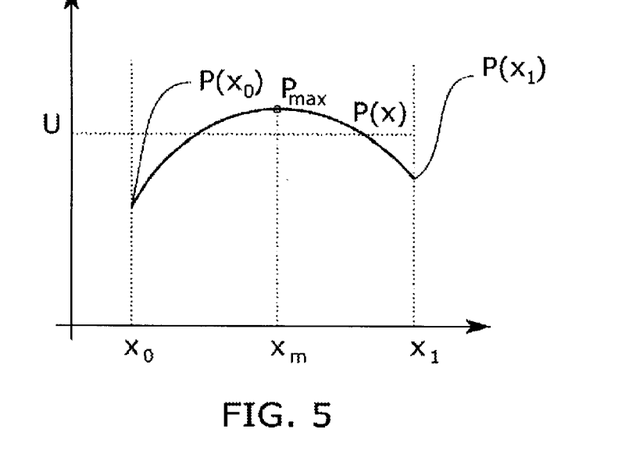

This case may refer for example to the situation in which the implementation of the correction has taken too long and therefore the Sun has moved a lot, hence the reading starts below the threshold value U; also the case of advancing in excess peaking and then falling again below the threshold value U.

In this case the estimated position of the Sun is also estimated by taking the value at which the maximum is found. See FIG. 5.

Where the instantaneous power measured at the end position is below the threshold, it is appropriate to conduct a new correction movement which takes into account the new estimation calculated of the Sun's position.

In all cases, the function P(x) is considered to extend for increasing values of its independent variable x, the angular position. However it is possible that the Sun's trajectory may advance in a direction in which the angular value is decreasing.

In this case, the explanations are equally applicable only that the initial point $x_0$ is to the right, the end point $x_1$ is to the left and P(x) progresses from right to left appearing in accordance with a mirror symmetry relative to a vertical axis. In these cases the term "advance" implies that the coordinate value relates to points located leftmost.

The description of the invention indicates that the $X_{sol}$ coordinates denote the angular coordinates of the estimation of the Sun's position.

However, in a practical case, when positioning commands are generated to the drive means so that the device is oriented according to the estimation, this does not happen. There are structural deformations, expansions, or small assembly failures that lead to differences between the target coordinates $X_{sol}$ and those actually taken $X_{dis}$ by the device.

A very familiar example is the use of reference values such as the solar equations, but they could be tabulated values also allowing intermediate values to be determined by interpolating techniques. These reference values allow for example the implementation of the method according to the first aspect of the invention based on values of the angular position. However, while allowing for instance solar tracking they do not however take into account the structural deviations, errors in the kinematic model of the tracker, or other causes which lead to the said errors between the target position and the position actually adopted by the solar energy harvesting module.

An exemplary embodiment of the invention takes into account the measured deviations while the orientation correction actions are conducted according to the first inventive aspect of the invention. In this case an error table is maintained to correct the values provided by a reference value. A first simple embodiment of the invention which accounts for these deviations, each time a corrective step is performed by means of any of the steps g), h) or i), it defines a correction factor $e=(e_1, e_2, \ldots)$ such that the estimation of the position of the Sun $X_{sol}=(y_1, y_2, \ldots)$ is $X_{sol}=X_{ref}+e$ for a given reference value $X_{ref}=(y_{r1}, y_{r2}, \ldots)$. In this case, for each axis $E_j$ the angular coordinate is updated as $e_j=y_j-y_{rj}$.

Figure 6:
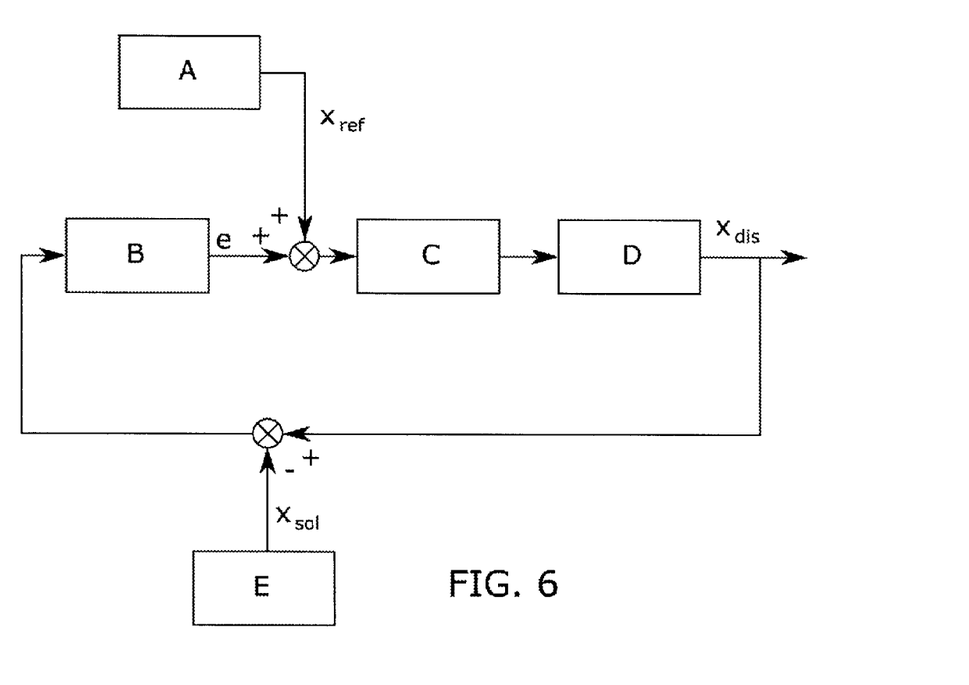
FIG. 6 shows a regulation diagram which takes into account the position error of a tracker according to an exemplary embodiment of the invention.

Other embodiments implement more complex corrective steps. This is the case shown in FIG. 6. FIG. 6 shows the use of a regulator to correct the position due to such positional errors. Rectangle A represents the equations of the Sun taken as an example of reference value $X_{ref}$. The corrective value e that comes from the controller B is added to this value $X_{ref}$. This corrective value is sent by movement execution commands to the drive means C which in turn act on the orientation device D. This orientation results in coordinates $X_{dis}$ which are compared with those established by an estimator E of the Sun's position $X_{sol}$, such as the one of the invention. This comparison is sent to the controller B closing a closed loop control.

In this embodiment, the corrective values e that come from the controller B would be stored in a table taking into account the time and the day. Thus, upon loss of the Sun it would be possible for example to get the device to target the Sun once again taking $X_{ref}$ based on the solar equations and adding the corrective action stored in these tables. Thus, an advantage of this correction factor is that, in the case of losing the sun, it can be recovered taking into account deviations, for instance, due to structural, assembly or accuracy failures of the mathematical model or kinematics.

According to another embodiment, if these values are stored from one day to the next, for example by maintaining circular lists which are updated every day, when the solar energy harvesting module becomes operative with each new day, it can achieve a better position from the beginning and it may have throughout the day a reference value after a stop due to clouds.

The invention claimed is:

1. Suitable control method for a system of CPV modules, wherein this system comprises:
   at least one solar energy harvesting module to supply energy to a load,
   an orientation device provided with one or more degrees of freedom $y_j$, j=1, 2, . . . according to one or more axes of rotation $E_j$, j=1, 2, . . . adapted to position the solar energy harvesting module at a specific angular position $X_{dis}=(\gamma_1', \text{ and } \gamma_2', \ldots )$,
   measuring means either of the power or of the current delivered by the solar energy harvesting module, and
   a processing unit coupled to the means for measuring the power or intensity delivered and adapted to generate commands which set the movement of the orientation device,
   wherein the control via the processing unit establishing the solar tracking by the solar energy harvesting module according to the following steps:
   defining a reference function $P_{ref}$ determining an estimation of the Sun's position $X_{sol}=(y_1, y_2, \ldots)=X_{ref}$ wherein $X_{ref}=(y_{r1}, y_{r2})=P_{ref}(t, lat, lon)$ dependent at let on the date, time, latitude and longitude,
   generating commands to orientate the orientation device to a first point $X_{dis}=X_{ref}$,
   for each axis of rotation $E_j$ setting a threshold value $\epsilon_j$, j=1, 2, . . . of minimum angular deviation, and
   for each instant of time $t_i$ from a sequence of time instants established by the processing unit, while the harvesting modules are operational, and in each of the axes of rotation of the orientation device $E_j$, j=1, 2, . . . , taking the $E_j$ axes in any order, the sequence of steps a)-e) is carried out:
   a) the estimation of the angular coordinate of the Sun's position $y_{rj}$ is determined based on the reference function $P_{ref}$ in $t_i$ and the angular deviation $\delta y_j$ between said estimated position $y_{rj}$ of the Sun and the angular position of the orientation device $y_j'$ in the previous instant of time is calculated,
   b) if the angular deviation $\gamma\delta_j$ is greater than its minimum deviation threshold value $\epsilon_j$ an advance distance $\alpha_j$ is set along the forward direction for the orientation device on that axis $E_j$, such that the position advanced $y_j'+\alpha_j$ is ahead of the Sun's estimated position $y_{rj}$ on that axis $E_j$, and a null value is set if the angular deviation is less than the same threshold value,
   c) determining $x_0$ as the initial position $y_j'$ before forward movement and $x_1=y_j'+\alpha_j$ as the final position after forward movement; and generating commands for the advance along the axis $E_j$ of the orientation device to point $x_1$,
   d) defining a function P(x) in the interval $[x_0, x_1]$ wherein P(x) corresponds to the measurement provided by the measuring means either of the power or of the current delivered by the solar energy harvesting module throughout the trajectory $[x_0, x_1]$ according to the axis $E_j$, and
   e) assessing the maximum $P_{max}$ of the function P(x) in the interval $[x_0, x_1]$ and the point $X_m$ at which such maximum $P_{max}=P(x_m)$ is located, and setting $y_j=x_0+\beta$ wherein $\beta<\alpha_j$, $\beta$ being such that $y_j$ takes the value $X_m$ wherein the maximum value $P_{max}=P(x_m)$ is located.

2. The method of claim 1 wherein before setting the value of $y_j$ in step e), a check is made as to whether there are disturbances that interfere with the reading of P(x) in which case $\beta=k\alpha_j$ wherein k takes values between 0 and 0.5, preferably 0.5.

3. The method of claim 1 wherein after evaluating the maximum $P_{max}$ in step e), a coefficient $c_u$ is evaluated being between 0 and 1, preferably 0.95, and a threshold value $U=c_uP_{max}$ such that if $P(x_0)$ is greater than U and $P(x_1)$ is smaller than U, then the point $x_2$ is calculated such that $P(x_2)=U$, and then $y_j=x_2-\beta$ is established wherein $\beta<\alpha_j$.

4. The method of claim 1 wherein after evaluating the maximum $P_{max}$ in step e), a coefficient $C_u$ is evaluated being between 0 and 1, preferably 0.95, and a threshold value $U=c_uP_{max}$ such that if $P(x_0)$ is smaller than U and $P(x_1)$ is greater than U, the point $x_2$ is calculated such that $P(x_2)=U$, and then $y_j=x_{2+}\beta$ is established wherein $\beta<\alpha_j$.

5. The method of claim 1 wherein the estimation of the Sun's position is altered by a comprehensive control correction.

6. The method of claim 1 wherein a correction factor $e=(e_1, e_2, \ldots )$ is defined, such that the estimation of the Sun's position $x_{sol}=(y_1, y_2, \ldots )$ used in step a) is a correction of the position taken based on the reference function $P_{ref}$ such that $x_{sol}=x_{ref}+e$.

7. The method of claim 6 wherein after the step determining $y_j$, said correction factor e for each axis $E_j$ is updated as $e_j=y_j-y_{rj}$.

8. The method of claim 1 wherein after step e) a check is performed as to whether the whole of the function P(x) is below a minimum threshold value in which case $U_m$ performs a solar search procedure.

9. The method of claim 1 wherein the system comprises time measuring means adapted to generate a sequence of 15 pulses which define for the processing unit the instants of time $t_i$ at which it must carry out the sequence of steps a)-e).

10. The method of claim 1 wherein the system comprises a solar radiation sensor such that, if the measured radiation is below a certain threshold value $U_r$ the processing unit postpones the instant of execution of the steps a)-e) until said radiation is again above the threshold value $U_r$.

11. The method of claim 1 wherein the solar tracker comprises a fixed load so that the processing unit generates commands to switch the load connected to the solar energy harvesting module to a fixed charge during registration of the function P(x) during the advance of angle $\alpha_j$.

12. The method of claim 1 wherein the system comprises components that generate interference in the reading of the means for measuring either the power or the current delivered by the solar energy harvesting module and wherein the processing unit comprises a disturbance measuring line so that the processing unit sets the function P(x) by the means for measuring the power or the current, compensating the reading of said means with the disturbance reading.

13. The method of claim 1 wherein the system comprises components which generate disturbances in the reading of the means for measuring either the power or the current delivered by the solar energy harvesting module and wherein the processing unit comprises an output in communication with disturbance generator components in order to, at least while the reading lasts, modify the operating parameters of the disturbance generator components to minimize its effect.

14. The method of claim 10 wherein the processing unit stores a table with the position correction values $e=(e_1, e_2, \ldots)$ over time for later use in the event of unavailability of readings of the measuring means either of the power or the current delivered by the solar energy harvesting module in order to establish the position of the Sun.

15. The method of claim 14 wherein the table is circular wherein the processing unit updates the oldest correction values for the instant of time calculated.

16. Energy harvesting device comprising a CPV module tracking system wherein this system in turn comprises:
    at least one solar energy harvesting module to supply energy to a load,
    an orientation device provided with one or more degrees of freedom $y_j$, $j=1, 2, \ldots$ according to one or more axes of rotation $E_j$, $j=1, 2$, adapted to position the solar energy harvesting module in a given angular position $X_{dis}=(y_1', y_2', \ldots)$,
    drive means adapted to move the orientation device along each of the rotational axes $E_j$, $j=1, 2, \ldots$,
    measuring means either of the power or the current delivered by the solar energy harvesting module,
    a processing unit coupled to the means for measuring the power or current delivered and adapted to generate commands to set the movement of the orientation device according to a method wherein the control via the processing unit establishing the solar tracking by the solar energy harvesting module according to the following steps:
    defining a reference function $P_{ref}$ determining an estimation of the Sun's position $X_{sol}=(y_1, y_2, \ldots)=X_{ref}$ wherein $X_{ref}=(y_{r1}, y_{r2})=P_{ref}(t, lat, lon)$ dependent at least on the date, time, latitude and longitude,
    generating commands to orientate the orientation v e to a first point $X_{dis}=X_{ref}$,
    for each axis of rotation $E_j$ setting a threshold value $\epsilon_j$, $j=1, 2, \ldots$ of minimum angular deviation, and
    for each instant of time $t_i$ from a sequence of time instants established by the processing unit, while the harvesting modules are operational, and in each of the axes of rotation of the or device $E_j$ $j=1, 2, \ldots$, taking the $E_j$ axes in any order, the sequence of steps a)-e) is carried out:
    a) the estimation of the angular coordinate of the Sun's position $y_{rj}$ is determined based on the reference function $P_{ref}$ in $t_1$ and the angular deviation $\delta y_j$ between said estimated position $y_{rj}$ of the Sun and the angular position of the orientation device $y_j'$ in the previous instant of time is calculated,
    b) if the angular deviation $\delta y_1$ is greater than its minimum deviation threshold value $\epsilon_j$ an advance distance $\alpha_j$ is set along the forward direction for the orientation device on that axis $E_j$, such that the position advanced $y_1'+\alpha_j$ is ahead of the Sun's estimated position $y_{rj}$ on that axis $E_j$, and a null value is set if the angular deviation is less than the same threshold value,
    c) determining $x_0$ as the initial position $y_j'$ before forward movement and $x_1=y_j'+\alpha_j$ as the final position after forward movement; and generating commands for the advance along the axis $E_j$ of the orientation device to point $x_1$,
    d) defining a function $P(x)$ in the interval $[x_0, x_1]$ wherein $P(x)$ corresponds to the measurement provided by the measuring means either of the power or of the current delivered by the solar energy harvesting module throughout the trajectory $[x_2, x_1]$ according to the axis $E_j$, and
    e) assessing the maximum $P_{max}$ of the function $P(x)$ in the interval $[x_0, x_1]$ and the point $X_m$ at which such maximum $P_{max}=P(x_m)$ is located, and setting $y_j=x_0+\beta$ wherein $\beta<\alpha_j$, $\beta$ being such that $y_j$ takes the value $X_m$ wherein the maximum value $P_{max}=P(x_m)$ is located.

17. The method of claim 5 wherein a correction factor $e=(e_1, e_2, \ldots)$ is defined, such that the estimation of the Sun's position $x_{sol}=(y_1, y_2, \ldots)$ used in step a) is a correction of the position taken based on the reference function $P_{ref}$ such that $X_{sol}=X_{ref}+e$.

18. The method of claim 17 wherein after the step determining $y_j$, said correction factor e for each axis $E_j$ is updated as $e_j=y_j-y_{rj}$.

* * * * *